(12) United States Patent
Wang

(10) Patent No.: US 9,432,664 B2
(45) Date of Patent: Aug. 30, 2016

(54) SIGNALING LAYER IDENTIFIERS FOR OPERATION POINTS IN VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 13/953,525

(22) Filed: Jul. 29, 2013

(65) Prior Publication Data

US 2014/0092955 A1 Apr. 3, 2014

Related U.S. Application Data

(60) Provisional application No. 61/707,486, filed on Sep. 28, 2012, provisional application No. 61/708,404, filed on Oct. 1, 2012.

(51) Int. Cl.
*H04N 7/26* (2006.01)
*H04N 19/196* (2014.01)
*H04N 19/70* (2014.01)
*H04N 19/30* (2014.01)
(Continued)

(52) U.S. Cl.
CPC ...... *H04N 19/00369* (2013.01); *H04N 19/196* (2014.11); *H04N 19/30* (2014.11); *H04N 19/31* (2014.11); *H04N 19/70* (2014.11); *H04N 19/597* (2014.11)

(58) Field of Classification Search
None
See application file for complete search history.

(56) References Cited

U.S. PATENT DOCUMENTS 8,259,800 B2 9/2012 Wang
8,665,964 B2 3/2014 Joshi et al.
(Continued)

FOREIGN PATENT DOCUMENTS

TW 201119346 A 6/2011
TW 201130312 A 9/2011
(Continued)

OTHER PUBLICATIONS

Bross et al., "High Efficiency Video Coding (HEVC) text specification draft 10 (for FDIS & Last Call)," 12th Meeting: Geneva, CH, Jan. 14-23, 2013, JCTVC-L1003_v34, 310 pp.
(Continued)

*Primary Examiner* — Kate Luo
(74) *Attorney, Agent, or Firm* — Shumaker & Sieffert, P.A.

(57) ABSTRACT

Techniques described herein are related to coding layer identifiers for operation points in video coding. In one example, a method of decoding video data is provided. The method comprises decoding syntax elements in a video parameter set (VPS) within a conforming bitstream indicating a first operation point having a first set of content. The method further comprises decoding, if present, syntax elements in the VPS within the conforming bitstream indicating hypothetical reference decoder (HRD) parameter information having a second set of content for the first operation point, wherein the conforming bitstream does not include syntax elements in the VPS that duplicate at least one of the first or second set of content for a second operation point, and wherein decoding syntax elements comprises decoding the syntax elements indicating the first operation point and the HRD parameter information only within conforming bitstreams.

34 Claims, 6 Drawing Sheets

(51) Int. Cl.
*H04N 19/31* (2014.01)
*H04N 19/597* (2014.01)

(56) References Cited

U.S. PATENT DOCUMENTS

| | | | |
|---|---|---|---|
| 8,780,999 | B2 | 7/2014 | Chen et al. |
| 8,938,767 | B2 | 1/2015 | Chen et al. |
| 8,976,871 | B2 | 3/2015 | Chen et al. |
| 2005/0147375 | A1 | 7/2005 | Kadono |
| 2006/0165298 | A1 | 7/2006 | Kikuchi |
| 2009/0010332 | A1 | 1/2009 | Jeon et al. |
| 2013/0057646 | A1 | 3/2013 | Chen et al. |

FOREIGN PATENT DOCUMENTS

| | | |
|---|---|---|
| TW | 201138471 A | 11/2011 |
| WO | 2011002813 | 1/2011 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Chen et al., "3D-HLS: Video parameter set for 3D-HEVC", JCT-3V Meeting; MPEG Meeting; Jul. 16, 2012-Jul. 20, 2012; Stockholm, SE; (The Joint Collaborative Team on 3D Video Coding Extension Development of ITU-T SG.16 WP3 and ISO/IEC JTC1/SC29/WG11); URL: http://phenix.int-evry.fr/JCT2/, No. JCT3V-A0099, XP030130098, 15 pp.

Chen et al., "AHG10: Video parameter set for HEVC extensions," JCT-VC Meeting; MPEG Meeting; Jul. 11, 2012-Jul. 20, 2012; Stockholm, SE; (Joint Collaborative Team on Video Coding of ITU-T SG.16 WP3 and ISO/IEC JTC1/SC29/WG11); URL: http://wftp3.itu.int/av-arch/jctvc-site/, No. JCTVC-J0124, 15 pp.

Chen et al., "AHG10: Video parameter set for HEVC base specification", JCT-VC Meeting; MPEG Meeting; Jul. 11, 2012-Jul. 20, 2012; Stockholm, SE; (Joint Collaborative Team on Video Coding of ITU-T SG.16 WP3 and ISO/IEC JTC1/SC29/WG11); URL: URL:http://wftp3.itu.int/AV-ARCH/JCTVC-SITE/, No. JCTVC-J0114, XP030112476, 15 pp.

International Search Report and Written Opinion—PCT/US2013/059274—ISA/EPO—Nov. 29, 2013, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wang et al., "AHG9: On video parameter set," JCT-VC Meeting; MPEG Meeting; Oct. 10, 2012-Oct. 19, 2012; Shanghai, CN; (Joint Collaborative Team on Video Coding of ITU-T SG.16 WP3 and ISO/IEC JTC1/SC29/WG11); URL: http://wftp3.itu.int/av-arch/jctvc-site/, No. JCTVC-K0125, XP030113007, 7 pp.

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

ITU-T H.265, Series H: Audiovisual and Multimedia Systems, Infrastructure of audiovisual services—Coding of moving video, Advanced video coding for generic audiovisual services, The International Telecommunication Union, Apr. 2013, 317 pp.

Response to Written Opinion dated Nov. 29, 2013, from International Application No. PCT/US2013/059274, filed on Jul. 28, 2014, 9 pp.

Second Written Opinion from International Application No. PCT/US2013/059274, dated Oct. 10, 2014, 7 pp.

Response to Second Written Opinion dated Oct. 10, 2014, from International Application No. PCT/US2013/059274, filed on Dec. 9, 2014, 27 pp.

International Preliminary Report on Patentability from International Application No. PCT/US2013/059274, dated Mar. 9, 2015, 11 pp.

SIGNALING LAYER IDENTIFIERS FOR OPERATION POINTS IN VIDEO CODING

This application claims priority to U.S. Provisional Application No. 61/707,486, filed on Sep. 28, 2012, and U.S. Provisional Application No. 61/708,404, filed on Oct. 1, 2012, the entire contents of which are incorporated herein by reference.

TECHNICAL FIELD

This disclosure generally relates to processing video data and, more particularly, processing operation points used in video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling layer identifiers for operation points in video coding. The techniques provide improved efficiency of signaling information associated with the operation points by disallowing coding of duplicate content for at least one of the operation points or hypothetical reference decoder (HRD) parameter information related to the operation points in a video parameter set (VPS) within a conforming bitstream. According to the techniques, the conforming bitstream may not include syntax elements in the VPS that duplicate a set of layer identifiers associated with a first operation point as content for a second operation point. In addition, according to the techniques, the conforming bitstream may not include syntax elements in the VPS that duplicate a set of HRD parameters associated with HRD parameter information for the first operation point as content for the second operation point. In this way, the set of layer identifiers and the set of HRD parameters are unique to the first operation point in the VPS.

In one example, the techniques described in this disclosure are related to a method for decoding video data. The method includes decoding syntax elements in a video parameter set (VPS) within a conforming bitstream indicating a first operation point having a first set of content. The method further includes decoding, if present, syntax elements in the VPS within the conforming bitstream indicating hypothetical reference decoder (HRD) parameter information having a second set of content for the first operation point, wherein the conforming bitstream does not include syntax elements in the VPS that duplicate at least one of the first or second set of content for a second operation point, and wherein decoding syntax elements comprises decoding the syntax elements indicating the first operation point and the HRD parameter information only within conforming bitstreams.

In another example, the techniques described in this disclosure are related to a method for encoding video data. The method includes encoding syntax elements in a VPS within a conforming bitstream indicating a first operation point having a first set of content. The method further includes encoding syntax elements in the VPS within the conforming bitstream indicating HRD parameter information having a second set of content for the first operation point, wherein the conforming bitstream does not include syntax elements in the VPS that duplicate at least one of the first or second set of content for a second operation point, and wherein encoding syntax elements comprises encoding the syntax elements indicating the first operation point and the HRD parameter information only from conforming bitstreams.

In another example, the techniques described in this disclosure are related to a video coding device. The video coding device is configured to code syntax elements in a VPS within a conforming bitstream indicating a first operation point having a first set of content. The video coding device is further configured to code, if present, syntax elements in the VPS within the conforming bitstream indicating HRD parameter information having a second set of content for the first operation point, wherein the conforming bitstream does not include syntax elements in the VPS that duplicate at least one of the first or second set of content for a second operation point, and wherein the video coder is configured to code the syntax elements indicating the first operation point and the HRD parameter information only within conforming bitstreams.

In yet another example, techniques described herein are related to a computer-readable storage medium. The computer-readable storage medium have stored thereon instructions that, when executed, cause a processor of a device for coding video data to code syntax elements in a VPS within a conforming bitstream indicating a first operation point having a first set of content. The instructions, when executed, further cause the processor to code, if present, syntax elements in the VPS within the conforming bitstream indicating HRD parameter information having a second set of content for the first operation point, wherein the conforming bitstream does not include syntax elements in the VPS that duplicate at least one of the first or second set of content for a second operation point, and wherein the processor is configured to code the syntax elements indicating the first operation point and the HRD parameter information only within conforming bitstreams.

Techniques described herein also include an example of a video coding device that includes means for coding syntax elements in a VPS within a conforming bitstream indicating a first operation point having a first set of content. The video coding device further includes means for coding, if present, syntax elements in the VPS within the conforming bitstream indicating HRD parameter information having a second set of content for the first operation point, wherein the conforming bitstream does not include syntax elements in the VPS that duplicate at least one of the first or second set of content for a second operation point, and wherein the video coding device is configured to code the syntax elements indicating the first operation point and the HRD parameter information only within conforming bitstreams.

The details of one or more examples are set forth in the accompanying drawings and the description below. Other features, objects, and advantages will be apparent from the description and drawings, and from the claims.

DETAILED DESCRIPTION

Figure 1:
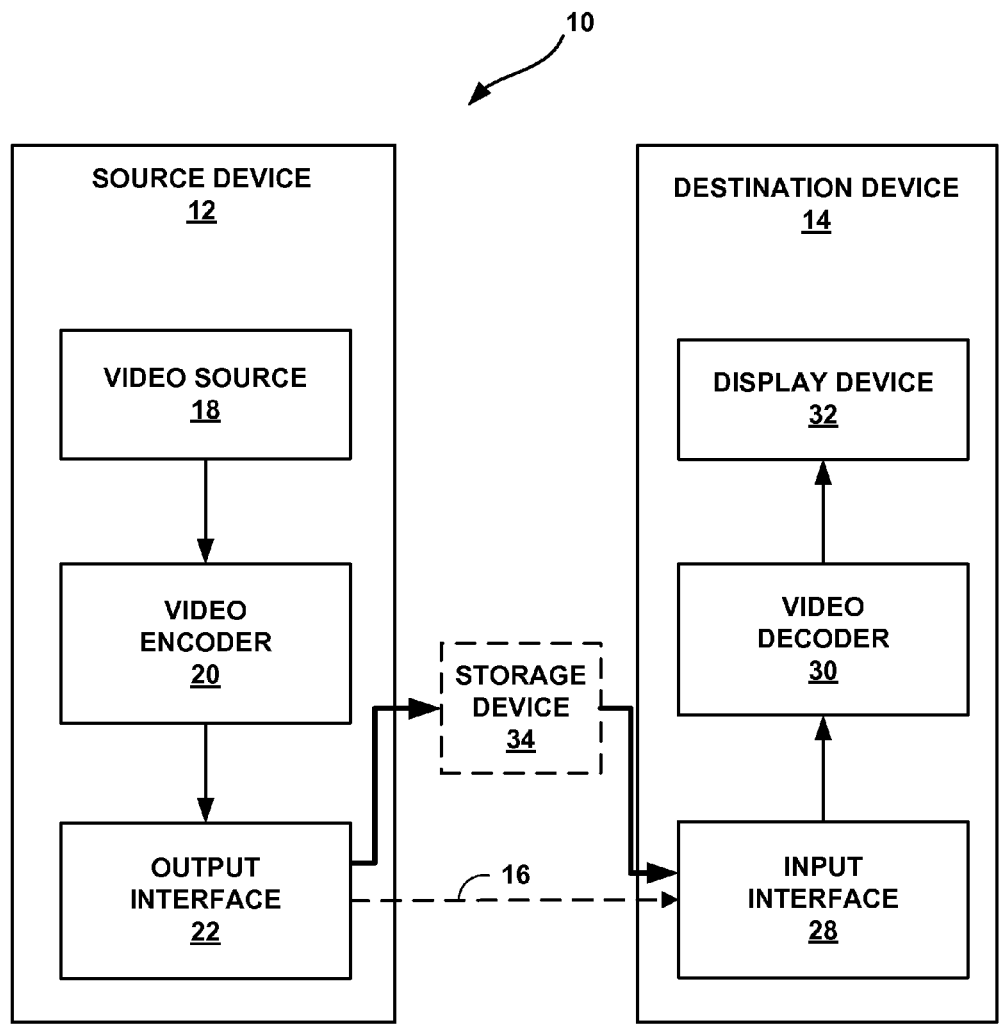
FIG. 1 is a block diagram illustrating an example video encoding and decoding system that may utilize the techniques described in this disclosure.

In general, this disclosure describes techniques for signaling layer identifiers for operation points in video coding. Operation points refer to sub-bitstreams that may be extracted from an original bitstream that is scalable temporally and/or with multiple layers or views. The sub-bitstreams may be extracted from the bitstream based on values of layer identifiers and temporal sub-layer identifiers that identify the operation point of the bitstream. The operation points are signaled in a video parameter set (VPS) within the bitstream. For each of the operation points, an operation point syntax structure specifies a set of layer identifiers used to identify network abstraction layer (NAL) units in the bitstream that belong to a sub-bitstream of a given operation point. In this way, NAL units that make up the sub-bitstream of the given operation point may be extracted from the original bitstream based on the layer identifiers of the NAL units.

In some cases, hypothetical reference decoder (HRD) parameters may be present that are related to one or more of the operation points. In this case, HRD parameter information is signaled in the VPS. For each of the one or more operation points that have HRD parameters, an HRD parameter syntax structure specifies a set of HRD parameters that defines an HRD used to check conformance of a sub-bitstream of a given operation point.

The techniques described in this disclosure include disallowing duplicate content for at least one of the operation points or the HRD parameter information associated with the operation points in a VPS within a conforming bitstream. The conforming bitstream may include syntax elements in the VPS that indicate a first operation point having a first set of content that may include a set of layer identifiers for the first operation point. The conforming bitstream may also include syntax elements in the VPS that indicate HRD parameter information having a second set of content that may include a set of HRD parameters for the first operation point. The conforming bitstream may not include syntax elements in the VPS that duplicate at least one of the first or second set of content for a second operation point.

According to the techniques, a video encoder is configured to encode only conforming bitstreams and a video decoder is configured to decode only conforming bitstreams. In one example, duplicate sets of layer identifiers for different operation points signaled in one VPS are disallowed in a conforming bitstream. In another example, duplicate sets of HRD parameters in HRD parameter information for different operation points signaled in one VPS are disallowed in a conforming bitstream. In this way, a given set of layer identifiers and a given set of HRD parameters are unique to a first operation point in the VPS. As another example, the techniques include coding HRD parameters for the bitstream wherein each copy of a HRD parameter syntax structure includes different content.

The techniques of this disclosure improve efficiency of signaling layer identifiers for operation points in a conforming bitstream. For example, the techniques may improve efficiency through coding only unique sets of content for operation points and for HRD parameter information associated with the operation points in a single VPS within a conforming bitstream, and disallowing coding of duplicate content for different operation points in the single VPS.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). The video coding standards further include Scalable Video Coding (SVC) and Multiview Video Coding (MVC) extensions of ITU-T H.264.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent Working Draft (WD) of HEVC is Working Draft 8, and referred to hereinafter as HEVC WD8. Bross et al., High Efficiency Video Coding (HEVC) Text Specification Draft 8, July 2012, Stockholm, available as of May 14, 2013 from http://phenix.int-evry.fr/jct/doc_end_user/documents/10_Stockholm/wg11/JCTVC-J1003-v8.zip. Although the techniques described in this disclosure are described with respect to the HEVC standard, aspects of this disclosure are not so limited and can be extended to other video coding standards, as well as proprietary video coding techniques.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In the example of FIG. 1, source device 12 includes video source 18, video encoder 20, and output interface 22. Destination device 14 includes input interface 28, video decoder 30, and display device 32. In other examples, source device 12 and destination device 14 may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video encoding and/or decoding device. Although generally the techniques are performed by a video encoding device or a video decoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications.

In each case, the captured, pre-captured, or computer-generated video may be encoded by video encoder 20. The encoded video data may be transmitted directly to destination device 14 via output interface 22 of source device 12. The encoded video data may also (or alternatively) be stored onto a storage device for later access by destination device 14 or other devices, for decoding and/or playback.

Link 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, link 16 may be understood to include one or more computer-readable media of various forms, in various examples. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Input interface 28 of destination device 14 receives information from link 16, which may be a computer-readable medium. The information from link 16 may include syntax information defined by video encoder 20, which is also used by video decoder 30, that includes syntax elements that describe characteristics and/or processing of blocks and other coded units, e.g., GOPs. Display device 32 may be integrated with, or external to, destination device 14. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Video encoder 20 and video decoder 30 may operate according to a video coding standard, such as the HEVC standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

HEVC WD8 also allows for stipulation of a limited number of subsets of the syntax by means of "profiles" and "levels." HEVC WD8 is designed to be generic in the sense that it serves a wide range of applications, bit rates, resolutions, qualities, and services. Applications should cover, among other things, digital storage media, television broadcasting and real-time communications. In the course of creating HEVC WD8, various requirements from typical applications have been considered, necessary algorithmic elements have been developed, and these have been integrated into a single syntax. Hence, HEVC WD8 will facilitate video data interchange among different applications. Considering the practicality of implementing the full syntax of HEVC WD8, however, the profiles and levels provide a means for limited number of subsets of the syntax.

A "profile" is defined as a subset of the entire bitstream syntax that is specified by HEVC WD8. Within the bounds imposed by the syntax of a given profile, it is still possible to require a very large variation in the performance of encoders and decoders depending upon the values taken by syntax elements in the bitstream. For example, specified size of decoded pictures may require a very large variation in the performance of encoders and decoders. In many applications, it is currently neither practical nor economic to implement a decoder capable of dealing with all hypothetical uses of the syntax within a particular profile.

In order to deal with this problem, "tiers" and "levels" are specified within each profile. A level of a tier is a specified set of constraints imposed on values of the syntax elements in the bitstream. These constraints may be simple limits on values. Alternatively they may take the form of constraints on arithmetic combinations of values (e.g., picture width multiplied by picture height multiplied by number of pictures decoded per second). A level specified for a lower tier is more constrained than a level specified for a higher tier. The same set of levels is defined for all profiles, with most aspects of the definition of each level being in common across different profiles. Individual implementations may, within specified constraints, support a different level for each supported profile. In a different context, level is the value of a transform coefficient prior to scaling. Profiles and levels are described in more detail in Annex A of HEVC WD8.

Coded video content conforming to HEVC WD8 uses a common syntax. In order to achieve a subset of the complete syntax, flags, parameters, and other syntax elements are included in the bitstream that signal the presence or absence of syntactic elements that occur later in the bitstream.

HEVC WD8 defines a sub-layer as a temporal scalable layer of a temporal scalable bitstream consisting of video coding layer (VCL) network abstraction layer (NAL) units with a particular value of the TemporalId variable, and the associated non-VCL NAL units. HEVC WD8 further defines a sub-layer representation as a subset of the bitstream consisting of NAL units of a particular sub-layer and the lower sub-layers.

Subclause 10.1 of HEVC WD8 describes bitstream subsets and an extraction process to generate sub-bitstreams. In general, HEVC WD8 describes extracting sub-bitstreams from the bitstream based on values of layer identifiers and temporal sub-layer identifiers that identify an operation point of the bitstream.

An operation point is a bitstream created from another bitstream by operation of the sub-bitstream extraction process with the another bitstream, a target highest TemporalId, and a target layer identifier list as inputs. An operation point is identified by a set of nuh_reserved_zero_6 bits values, denoted as OpLayerIdSet, and a TemporalId value, denoted as OpTid, and the associated bitstream subset derived as the output of the sub-bitstream extraction process as specified in HEVC WD8 with OpTid and OpLayerIdSet as inputs is independently decodable. If the target highest TemporalId of an operation point is equal to the greatest value of TemporalId in the layer set associated with the target layer identification list, the operation point is identical to the layer set. Otherwise the operation point is a subset of the layer set.

A sub-bitstream extraction process is a specified process by which NAL units in a bitstream that do not belong to a target set, determined by a target highest TemporalId and a target layer identifier list, layerIdListTarget, are removed from the bitstream, with the output sub-bitstream consisting of the NAL units in the bitstream that belong to the target set. Inputs to the sub-bitstream extraction process are a variable tIdTarget and the list targetDecLayerIdSet. Output of the sub-bitstream extraction process is a sub-bitstream. The sub-bitstream is derived by removing from the bitstream all NAL units with TemporalId greater than tIdTarget or nuh_reserved_zero_6 bits not among the values in target-DecLayerIdSet.

Any sub-bitstream that is included in the output of the sub-bitstream extraction process specified in subclause 10.1 of HEVC WD8 with tIdTarget equal to any value in the range of 0 to 6, inclusive, and with targetDecLayerIdSet containing the value 0 conforms to HEVC WD8. A bitstream conforming to HEVC WD8 may contain one or more coded slice NAL units with nuh_reserved_zero 6 bits equal to 0 and TemporalId equal to 0.

The current HEVC design has the following shortcomings. First, temporal subsets for a coded video sequence are allowed to signal a set of profile space, tier, compatible profiles, and profile-related constraints that is different from that of the entire coded video sequence. However, it does not make sense for a temporal subset to use a different profile space, and there are no apparent use cases where it would be beneficial for temporal subsets to have the other values (such as tier, compatible profiles, and profile-related constraints) different than the entire coded video sequence.

Second, currently, the set of nuh_reserved_zero_6 bits values (i.e., layer IDs) for each operation point, except for the first one, is signaled by explicitly signaling each of the layer IDs included in the coded video sequence to be decoded. However, in most scalability coding scenarios, the layer dependency relationship is linear, and signaling of only the target layer ID would be sufficient. Furthermore, for a non-linear layer dependency relationship, which is typical for multiview coding scenarios where multiple layer IDs are signaled, the layer IDs can be differentially coded. Differentially coding the layer IDs is simple and efficient, similar to, e.g., coding of picture order count (POC) values in short-term reference picture set signaling. Lastly, it is allowed to have duplicate sets of layer IDs signaled.

Third, the current HEVC design also has a shortcoming in that it is allowed to have duplicate hrd_parameters( ) syntax structures with the same content.

The following techniques are included in this disclosure to address the above shortcomings. First, syntax elements for signaling of profile space, tier, compatible profiles, and profile-related constraints for temporal sub-layers are removed from the profile_tier_level( ) syntax structure. Thus bits unnecessarily used on those syntax elements for the temporal sub-layers are saved.

Second, a simple operation point mode, for which only one value of nuh_reserved_zero_6 bits (i.e., layer ID) needs to be signaled, is defined. The signaling of operation points is changed to enable signaling of only one value of nuh_reserved_zero_6 bits for operation points with the simple operation point mode. When multiple values of the nuh_reserved_zero_6 bits (i.e., layer IDs) are signaled, they are differentially coded. This method of signaling operation points is more efficient for any scalability coding, multiview and/or 3DV (3-dimensional video) coding scenarios with linear layer dependency. Furthermore, in accordance with the techniques of this disclosure, within one VPS, duplicate sets of layer IDs signaled for different operation points in a VPS are disallowed. In this way, a given set of layer identifiers is unique to a given operation point in the VPS.

Third, in accordance with the techniques of this disclosure, duplicate sets of HRD parameters coded in hrd_parameters( ) syntax structures associated with the operation points in the VPS are disallowed. In this way, a given set of HRD parameters in HRD parameter information associated with a given operation point is unique to the given operation point in the VPS.

For example, video encoder 20 encodes syntax elements in a VPS within a conforming bitstream. The syntax elements indicate a first operation point having a first set of content. Video encoder 20 further encodes syntax elements in the VPS within the conforming bitstream that indicate HRD parameter information having a second set of content for the first operation point. The conforming bitstream does not include syntax elements in the VPS that duplicate at least one of the first or second set of content for a second operation point. Thus, video encoder 20 encodes each operating point with unique content, such as different sets of layer IDs. As a further example, video encoder 20 may encode HRD parameters for the bitstream wherein each copy of a HRD parameter syntax structure includes different content.

Similarly, according to the techniques described in this disclosure, video decoder 30 decodes syntax elements in a VPS within a conforming bitstream. The syntax elements indicate a first operation point having a first set of content. In some examples, video decoder 30 receives the encoded conforming bitstream from video encoder 20. Video decoder 30 further decodes, if present, syntax elements in the VPS within the conforming bitstream that indicate HRD parameter information having a second set of content for the first operation point. The conforming bitstream does not include syntax elements in the VPS that duplicate at least one of the first or second set of content for a second operation point. Thus, video decoder 30 decodes each operating point with unique content, such as different sets of layer IDs. As a further example, video decoder 30 may decode HRD parameters for the bitstream wherein each copy of a HRD parameter syntax structure includes different content. In additional examples, the second set of content comprises a set of HRD parameters for the first operation point that defines a HRD used to check conformance of a sub-bitstream of the first operation point.

The syntax elements indicating the first operation point may include an operation_point( ) syntax structure in the VPS within the conforming bitstream. Further, the syntax elements indicating the HRD parameter information may comprise a hrd_parameters( ) syntax structure in the VPS within the conforming bitstream.

In the above examples, the conforming bitstream may not include syntax elements in the VPS that duplicate the first set of content for the second operation point, the first set of content being unique to the first operation point in the VPS. Further, the conforming bitstream may not include syntax elements in the VPS that duplicate the HRD parameter information having the second set of content for the second operation point, the second set of content being unique to the first operation point in the VPS.

In some examples, video encoder 20 may further indicate whether a simple operation point mode is used for each of a plurality of operation points of a bitstream. When the simple operation point mode is used for a particular one of the operation points, video encoder 20 may encode only one target layer identifier for the particular operation point. As another example, video encoder 20 may encode profile space, tier, compatible profiles, and/or profile-related constraints for a bitstream, but not encode separate profile space, tier, compatible profiles, or profile-related constraints for temporal sub-layers of the bitstream.

Likewise, video decoder 30 may receive an indication whether a simple operation point mode is used for each of a plurality of operation points of a bitstream. When the simple operation point mode is used for a particular one of the operation points, video decoder 30 may decode only one target layer identifier for the particular operation point. As another example, video decoder 30 may decode profile space, tier, compatible profiles, and/or profile-related constraints for a bitstream, but not decode separate profile space, tier, compatible profiles, or profile-related constraints for temporal sub-layers of the bitstream.

Figure 2:
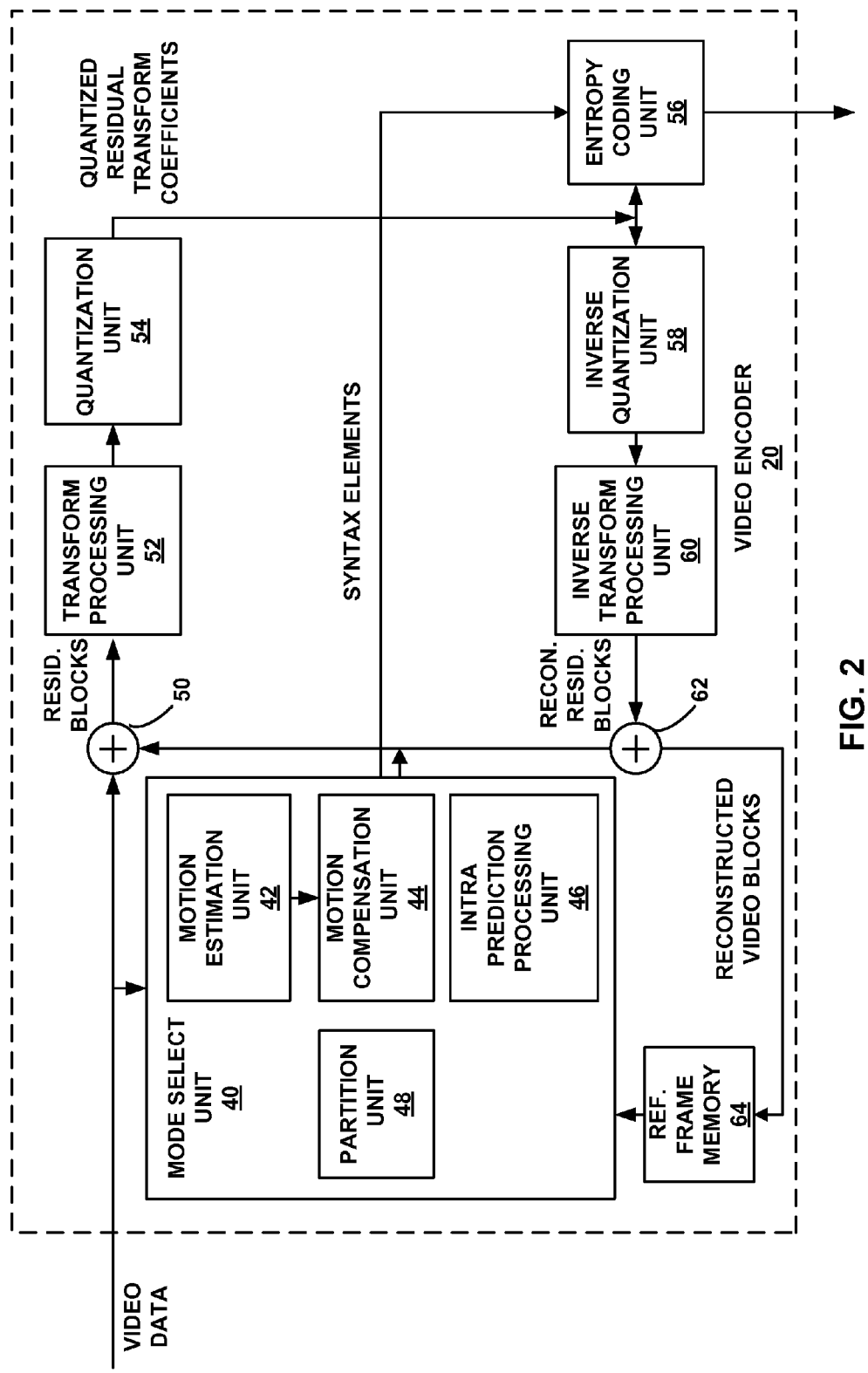
FIG. 2 is a block diagram illustrating an example video encoder that may implement the techniques described in this disclosure.

FIG. 2 is a block diagram illustrating an example of video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. A deblocking filter may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy coding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy coding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video encoder 20 of FIG. 2 represents an example of a video encoder configured to implement one or more of the techniques described herein. Video encoder 20 signals operation points in a video parameter set (VPS) associated with a bitstream. Operation points refer to sub-bitstreams that may be extracted from an original bitstream that is scalable temporally and/or with multiple layers or views. In HEVC, an operation point may be identified by a set of nuh_reserved_zero_6 bits values, denoted as OpLayerIdSet, and a TemporalId value, denoted as OpTid. As an example, an original bitstream may include three layers or views at different spatial resolutions and two temporal scalable layers at different frame rates. In this example, the original bitstream includes six operation points with each of the three spatial resolutions available at either frame rate.

For each of the operation points that video encoder 20 signals in the VPS associated with the bitstream, an operation point syntax structure specifies a set of layer identifiers (IDs) used to identify network abstraction layer (NAL) units in the bitstream that belong to a sub-bitstream of a given operation point. In this way, NAL units that make up the sub-bitstream of the given operation point may be extracted from the original bitstream based on the layer identifiers of the NAL units.

In some cases, video encoder 20 may further encodes hypothetical reference decoder (HRD) parameters that are related to one or more of the operation points. In this case, video encoder 20 signals HRD parameter information in the VPS. For each of the one or more operation points that have HRD parameters, an HRD parameter syntax structure specifies a set of HRD parameters that defines an HRD used to check conformance of a sub-bitstream of a given operation point.

Conventionally, video coding standards allow bitstreams to include duplicate sets of layer identifiers to be signaled for operation points in a VPS. This means that two or more operation points may have the same set of layer identifiers and, therefore, identify the same NAL units to make up the sub-bitstreams of the operation points. In this way, multiple operation points may refer to the same content of the bitstream. Similarly, video coding standards allow bitstreams to include duplicate sets of HRD parameters to be signaled for operation points in a VPS. This means that two or more sets of HRD parameters may have the same content and, therefore, define two identical HRDs to check conformance of sub-bitstreams of the related operation points. In both cases, the signaling is redundant and an inefficient use of bits.

The techniques of this disclosure improve efficiency of signaling information associated with the operation points by disallowing signaling of duplicate content for either the operation points or the HRD parameters related to the operation points in a VPS within a conforming bitstream. According to the techniques of this disclosure, video encoder 20 may encode syntax elements in a VPS within a conforming bitstream indicating a first operation point having a first set of content. Video encoder 20 may also encode, if present, syntax elements in the VPS within the conforming bitstream indicating HRD parameter information having a second set of content for the first operation point. The conforming bitstream does not include syntax elements in the VPS that duplicate at least one of the first or second set of content for a second operation point, and video encoder 20 is configured to only encode conforming bitstreams. As described above, the first set of content may comprise a set of layer identifiers for the first operation point, and the second set of content may comprise a set of HRD parameters for the first operation point.

In one example, video encoder 20 will only encode a conforming bitstream such that after encoding syntax elements in a VPS within a bitstream indicating a first operation point having a first set of layer identifiers, video encoder 20 does not encode syntax elements in the VPS that duplicate the first set of layer identifiers for a second operation point. The techniques of this disclosure have disallowed duplicate sets of layer identifiers for operation points in the same VPS within a conforming bitstream. The first set of layer identifiers must be unique to the first operation point in the VPS or the bitstream will be non-conforming. That is, for example, a non-conforming bitstream may contain a first set of layer identifiers for a first operation point and also a second set of layer identifiers for a second operation point, wherein the second set includes the same layer identifiers as the first set. Video encoder 20, therefore, should not encode syntax elements in the VPS of the conforming bitstream that duplicate sets of layer identifiers for the first operation point and the second operation point.

In another example, HRD parameters may be present for a first operation point. In this case, after encoding syntax elements in a VPS within a bitstream indicating HRD parameter information having a first set of HRD parameters for the first operation point, video encoder 20 does not encode syntax elements in the VPS that duplicate the first set of HRD parameters for a second operation point. The techniques of this disclosure have disallowed duplicate sets of HRD parameters for operation points in the same VPS within a conforming bitstream. The first set of HRD parameters must be unique to the first operation point in the VPS or the bitstream will be non-conforming. Video encoder 20, therefore, should not encode syntax elements in the VPS of the conforming bitstream that duplicates sets of HRD parameters for the first operation point and the second operation point.

In another example, video encoder 20 may indicate whether a simple operation point mode is used for each of a plurality of operation points of a bitstream, and, when the simple operation point mode is used for a particular one of the operation points, encode only one target layer identifier for the particular operation point. A simple operation point mode is a mode in which for each operation point the OpLayerIdSet includes and only includes a particular value of nuh_reserved_zero_6 bits and all other values of nuh_reserved_zero_6 bits less than the particular value of nuh_reserved_zero_6 bits. In some examples, when video encoder 20 encodes multiple values of the nuh_reserved_zero_6 bits (i.e. layer IDs) are signaled, video encoder 20 differentially encodes the values. Thus, signaling of operation points is more efficient, for any scalability coding, multiview and/or 3DV coding scenarios with linear layer dependency. As described above, video encoder 20 does not encode a duplicate set of layer IDs within one VPS.

As another example, video encoder 20 may encode profile space, tier, compatible profiles, and/or profile-related constraints for a bitstream, but not encode separate profile space, tier, compatible profiles, or profile-related constraints for temporal sub-layers of the bitstream. As described above, video encoder 20 may encode HRD parameters for the bitstream wherein each copy of a HRD parameter syntax structure includes different content.

Video encoder 20 may utilize the following syntax and semantics. An example video parameter set raw byte sequence payload (RBSP) is defined as follows in Table 1.

TABLE 1

Video Parameter Set RBSP Syntax and Semantics

| video_parameter_set_rbsp( ) { | Descriptor |
|---|---|
|     video_parameter_set_id | u(4) |
|     vps_temporal_id_nesting_flag | u(1) |
|     vps_reserved_zero_2bits | u(2) |
|     vps_reserved_zero_6bits | u(6) |
|     vps_max_sub_layers_minus1 | u(3) |
|     profile_tier_level( 1, vps_max_sub_layers_minus1 ) | |
|     vps_reserved_zero_12bits | u(12) |
|     for( i = 0; i <= vps_max_sub_layers_minus1; i++ ) { | |
|         vps_max_dec_pic_buffering[ i ] | ue(v) |
|         vps_max_num_reorder_pics[ i ] | ue(v) |
|         vps_max_latency_increase[ i ] | ue(v) |
|     } | |
|     vps_num_hrd_parameters | ue(v) |
|     for( i = 0; i < vps_num_hrd_parameters; i++ ) { | |
|         vps_simple_op_mode_flag[ i ] | u(1) |
|         if( i > 0 ) | |
|             operation_point( i ) | |
|         hrd_parameters( i = = 0, | |
|         vps_max_sub_layers_minus1 ) | |
|     } | |
|     vps_extension_flag | u(1) |
|     if( vps_extension_flag ) | |
|         while( more_rbsp_data( ) ) | |
|             vps_extension_data_flag | u(1) |
|     } | |
|     rbsp_trailing_bits( ) | |
| } | |

The flag vps_simple_op_mode_flag[i] equal to 1 specifies that the simple operation point mode is in use for the $i^{th}$ operation_point_layer_ids( ) synax structure. When vps_simple_op_mode_flag[i] equals 0, the flag specifies that the simple operation point mode is not in use for the $i^{th}$ operation_point( ) synax structure.

Any two instances of the syntax structure hrd_parameters (i, vps_max_sub_layers_minus1) and hrd_parameters(j, vps_max_sub_layers_minus1), where i is not equal to j, shall not have the same content. Thus, video encoder 20 encodes a syntax structure that includes only unique HRD parameters.

Table 2 provides an example profile, tier and level syntax and semantics.

TABLE 2

Profile, Tier, and Level Syntax and Semantics

| profile_tier_level( ProfilePresentFlag, MaxNumSubLayersMinus1 ) { | Descriptor |
|---|---|
|     if( ProfilePresentFlag ) { | |
|         general_profile_space | u(2) |
|         general_tier_flag | u(1) |
|         general_profile_idc | u(5) |

TABLE 2-continued

Profile, Tier, and Level Syntax and Semantics

| profile_tier_level( ProfilePresentFlag, MaxNumSubLayersMinus1 ) { | Descriptor |
|---|---|
|     for( i = 0; i < 32; i++ ) | |
|         general_profile_compatibility_flag[ i ] | u(1) |
|         general_reserved_zero_16bits [Ed. (GJS): Adjust semantics accordingly.] | u(16) |
|     } | |
|     general_level_idc | u(8) |
|     for( i = 0; i < MaxNumSubLayersMinus1; i++ ) { | |
|         if( ProfilePresentFlag ) | |
|             sub_layer_profile_present_flag[ i ] | u(1) |
|         sub_layer_level_present_flag[ i ] | u(1) |
|         if( sub_layer_profile_present_flag[ i ] ) | |
|             sub_layer_profile_idc[ i ] | u(5) |
|         if( sub_layer_level_present_flag[ i ] ) | |
|             sub_layer_level_idc[ i ] | u(8) |
|     } | |
| } | |

The flag sublayer_profile_present_flag[i] being equal to 1, when ProfilePresentFlag is equal to 1, specifies that profile information is present in the profile_tier_level( ) syntax structure for the representation of the sub-layer with TemporalId equal to i. The flag sub_layer_profile_present_flag[i] being equal to 0 specifies that profile information is not present in the profile_tier_level( ) syntax structure for the representations of the sub-layer with TemporalId equal to i. When not present, the value of sub_layer_profile_present_flag[i] is inferred to be equal to 0.

The flag sub_layer_level_present_flag[i] being equal to 1 specifies that level information is present in the profile_tier_level( ) syntax structure for the representation of the sub-layer with TemporalId equal to i. The flag sub_layer_level_present_flag[i] being equal to 0 specifies that level information is not present in the profile_tier_level( ) syntax structure for the representation of the sub-layer with TemporalId equal to i.

The syntax elements sub_layer_profile_idc[i] and sub_layer_level_idc[i] have the same semantics as general_profile_idc and general_level_idc, respectively, but apply to the representation of the sub-layer with TemporalId equal to i.

Video encoder 20, for example, may encode sub_layer_profile_present_flag[i] equal to 1 to indicate that profile information is present in the profile_tier_level( ) syntax structure for the representation of the sub-layer with TemporalId equal to i. Video encoder 20 may not signal syntax elements for signaling of profile space, tier, compatible profiles, and profile-related constrains for temporal sub-layers in the profile_tier_level( ) syntax structure.

Table 3 provides an example operation point syntax and semantics.

TABLE 3

Operation Point Syntax and Semantics

| operation_point( opIdx ) { | Descriptor |
|---|---|
|     op_first_present_layer_id[ opIdx ] | u(6) |
|     if( !vps_simple_op_mode_flag[ opIdx ] ) { | |
|         op_num_layer_id_values_minus1[ opIdx ] | ue(v) |
|         for( i = 1; i <= op_num_layer_id_values_minus1[ opIdx ]; i++ ) | |
|             op_layer_id_delta_minus1[ opIdx ][ i ] | ue(v) |
|     } | |
| } | |

The operation_point(opIdx) syntax structure specifies the set of nuh_reserved_zero_6 bits values included in the OpLayerIdSet of the operation points to which the opIdx-th hrd_parameters( ) syntax structure in the video parameter set applies.

When vps_simple_op_mode_flag[opIdx] is equal to 0, the syntax element op_first_present_layer_id[opIdx] specifies the first (i.e. the 0-th) value of nuh_reserved_zero_6 bits included in the OpLayerIdSet of the operation points to which the opIdx-th hrd_parameters( ) syntax structure in the video parameter set applies. When vps_simple_op_mode_flag[opIdx] is equal to 1, op_first_present_layer_id[opIdx] specifies the greatest value of nuh_reserved_zero_6 bits included in the OpLayerIdSet of the operation points to which the opIdx-th hrd_parameters( ) syntax structure in the video parameter set applies.

When vps_simple_op_mode_flag[opIdx] is equal to 0, the syntax element op_num_layer_id_values_minus1[opIdx] plus 1 specifies the number of nuh_reserved_zero_6 bits values included in the OpLayerIdSet of the operation points to which the opIdx-th hrd_parameters( ) syntax structure in the video parameter set applies. Values of op_num_layer_id_values_minus1[opIdx] shall be less than or equal to 63.

When vps_simple_op_mode_flag[opIdx] is equal to 0, op_layer_id_delta_minus1[opIdx][i] plus 1 specifies the difference between the $i^{th}$ value of nuh_reserved_zero_6 bits and the $(i-1)^{th}$ value of nuh_reserved_zero_6 bits included in the OpLayerIdSet of the operation points to which the opIdx$^{th}$ hrd_parameters( ) syntax structure in the video parameter set applies. The value of op_layer_id_delta_minus1[opIdx][i] shall be in the range of 0 to 63, inclusive.

The variable NumOpLayerIdsMinus1[opIdx] is derived as follows.

if (vps_simple_op_mode_flag[opIdx])
        NumOpLayerIdsMinus1[opIdx]=op_first_present_layer_id[opIdx] else
        NumOpLayerIdsMinus1[opIdx]=op_num_layer_id_values_minus1[opIdx]NumOpLayerIdsMinus1[0] is inferred to be equal to 0.

The variables OpLayerId[opIdx][i], for i in the range of 0 to NumOpLayerIdsMinus1[opIdx], inclusive, are derived as follows.

OpLayerId[opIdx][0]=vps_simple_op_mode_flag[opIdx] ? 0: op_first_present_layer_id[opIdx]
    for (i=1; i<=NumOpLayerIdsMinus1[opIdx]; i++)
        if (vps_simple_op_mode_flag[opIdx])
            OpLayerId[opIdx][i]=i
        else
            OpLayerId[opIdx][i]=
            OpLayerId[opIdx][i−1]+op_layer_id_delta_minus1[opIdx][i]+1

The value of OpLayerId[0][0] is inferred to be equal to 0.

No value of OpLayerId[opIdx][i] shall be equal to OpLayerId[opIdx][j] when i is not equal to j and both i and j are in the range of 0 to NumOpLayerIdsMinus1[opIdx], inclusive.

Any two sets OpLayerId[opIdx1] and OpLayerId[opIdx2], where opIdx1 is not equal to opIdx2, shall not include the same sets of nuh_reserved_zero_6 bits values.

The OpLayerIdSet of the operation points to which the opIdx-th hrd_parameters( ) syntax structure in the video parameter set applies is set to include and only include the nuh_reserved_zero_6 bits values equal to OpLayerId[opIdx][i], for i in the range of 0 to NumOpLayerIdsMinus1[opIdx], inclusive.

Thus, video encoder 20 may encode syntax elements in a VPS within a conforming bitstream indicating a first operation point having a first set of content using techniques described herein. The conforming bitstream does not include syntax elements in the VPS that duplicate at least one of the first or second set of content for a second operation point, and wherein the video decoder is configured to only decode conforming bitstreams. For example, video encoder 20 encodes the conforming bitstream such that it does not include syntax elements in the VPS that duplicate the first set of content for the second operation point, the first set of content being unique to the first operation point in the VPS.

Table 4 provides an alternative example operation point syntax and semantics.

TABLE 4

Alternative Operation Point Syntax and Semantics

| operation_point( opIdx ) { | Descriptor |
|---|---|
| if( !vps_simple_op_mode_flag[ opIdx ] ) | |
| op_num_layer_id_values_minus1[ opIdx ] | ue(v) |
| for( i = 0; i <= op_num_layer_id_values_minus1[ opIdx ]; i++ ) | |
| op_layer_id[ opIdx ][ i ] | u(6) |
| } | |

The operation_point(opIdx) syntax structure specifies the set of nuh_reserved_zero_6 bits values included in the OpLayerIdSet of the operation points to which the opIdx-th hrd_parameters( ) syntax structure in the video parameter set applies.

The syntax element op_num_layer_id_values_minus1 [opIdx] plus 1 specifies the number of nuh_reserved_zero_6 bits values included in the OpLayerIdSet of the operation points to which the opIdx-th hrd_parameters( ) syntax structure in the video parameter set applies. The value of op_num_layer_id_values_minus1[opIdx] shall be less than or equal to 63. When not present, the value of op_num_layer_id_values_minus1[opIdx] is inferred to be equal to 0.

In bitstreams conforming to the techniques described herein, op_num_layer_id_values_minus1[opIdx] shall be equal to 0. Although the value of op_num_layer_id_values_minus1[opIdx] is required to be equal to 0 in some examples, video decoders, such as video decoder 30, shall allow other values to appear in the op_num_layer_id_values_minus1[opIdx] syntax.

The syntax element op_layer_id[opIdx][i] specifies the $i^{th}$ value of nuh_reserved_zero_6 bits included in the OpLayerIdSet of the operation points to which the $opIdx^{th}$ hrd_parameters( ) syntax structure in the video parameter set applies.

The variable NumOpLayerIdsMinus1[opIdx] is derived as follows.
  if (vps_simple_op_mode_flag[opIdx])
    NumOpLayerIdsMinus1[opIdx]=op_layer_id[opIdx] [0]
  else
    NumOpLayerIdsMinus1[opIdx]=op_num_layer_id_values_minus1[opIdx]NumOpLayerIdsMinus1 [0] is inferred to be equal to 0.

The variables OpLayerId[opIdx][i], for i in the range of 0 to NumOpLayerIdsMinus1[opIdx], inclusive, are derived as follows.
  for (i=0; i<=NumOpLayerIdsMinus1[opIdx]; i++)
    OpLayerId[opIdx][i]=vps_simple_op_mode_flag [opIdx] ? i:
    op_layer_id[opIdx][i]
The value of OpLayerId[0][0] is inferred to be equal to 0.

No value of OpLayerId[opIdx][i] shall be equal to OpLayerId[opIdx][j] when i is not equal to j and both i and j are in the range of 0 to NumOpLayerIdsMinus1[opIdx], inclusive.

Any two sets OpLayerId[opIdx1] and OpLayerId[opIdx2], where opIdx1 is not equal to opIdx2, shall not include the same sets of nuh_reserved_zero_6 bits values.

The OpLayerIdSet of the operation points to which the $opIdx^{th}$ hrd_parameters( ) syntax structure in the video parameter set applies is set to include and only include the nuh_reserved_zero_6 bits values equal to OpLayerId[opIdx] [i], for i in the range of 0 to NumOpLayerIdsMinus1[opIdx], inclusive.

Thus, according to the techniques described herein, video encoder 20 may indicate whether a simple operation point mode is used for each of a plurality of operation points of a bitstream. When the simple operation point mode is used for a particular one of the operation points, video encoder 20 may encode only one target layer identifier for the particular operation point. As another example, video encoder 20 may encode profile space, tier, compatible profiles, and/or profile-related constraints for a bitstream, but not encode separate profile space, tier, compatible profiles, or profile-related constraints for temporal sub-layers of the bitstream. As a further example, video encoder 20 may encode HRD parameters for the bitstream wherein each copy of a HRD parameter syntax structure includes different content.

Figure 3:
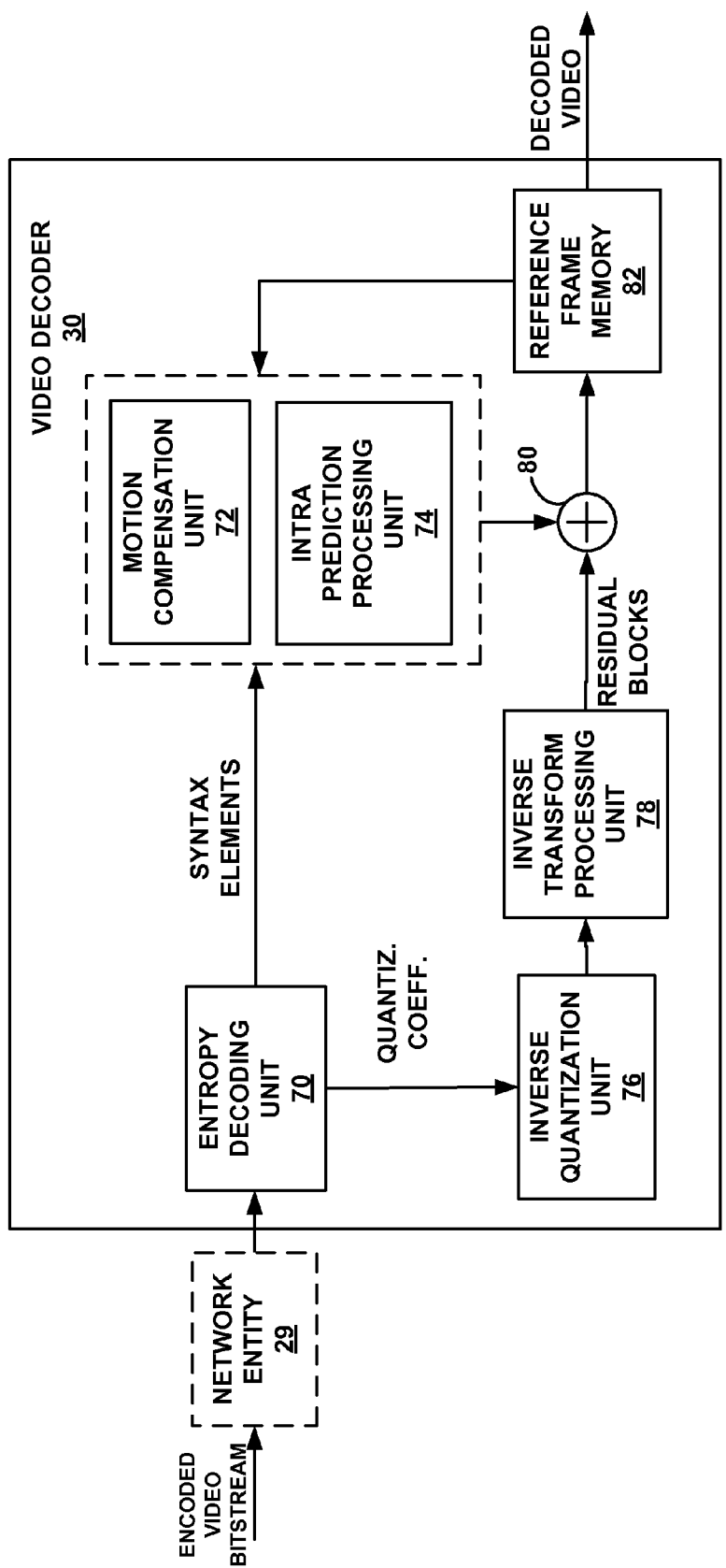
FIG. 3 is a block diagram illustrating an example video decoder that may implement the techniques described in this disclosure.

FIG. 3 is a block diagram illustrating an example of video decoder 30 that may implement the techniques described in this disclosure. In the example of FIG. 3, video decoder 30 includes an entropy decoding unit 70, motion compensation unit 72, intra prediction processing unit 74, inverse quantization unit 76, inverse transformation processing unit 78, reference frame memory 82 and summer 80. Video decoder 30 may, in some examples, perform a decoding pass generally reciprocal to the encoding pass described with respect to video encoder 20, as shown in FIG. 2.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. Network entity 29 may include an external means configured to perform the techniques of this disclosure. As described above, some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Video decoder 30 of FIG. 3 represents an example of a video decoder configured to implement one or more of the techniques described herein. The techniques of this disclosure improve efficiency of signaling information associated with the operation points by disallowing signaling of duplicate content for either the operation points or the HRD parameters related to the operation points in a VPS within a conforming bitstream. According to the techniques of this disclosure, video decoder 30 may decode syntax elements in a VPS within a conforming bitstream indicating a first operation point having a first set of content. In addition, video decoder 30 may decode, if present, syntax elements in the VPS within the conforming bitstream indicating HRD parameter information having a second set of content for the first operation point. The conforming bitstream does not include syntax elements in the VPS that duplicate at least one of the first or second set of content for a second operation point, and video decoder 30 is configured to only decode conforming bitstreams. As described above, the first set of content may comprise a set of layer identifiers for the first operation point and the second set of content may comprise a set of HRD parameters for the first operation point.

In one example, after decoding syntax elements in a VPS within a bitstream indicating a first operation point having a first set of layer identifiers, video decoder 30 will only continue decoding if the bitstream is a conforming bitstream that does not include syntax elements in the VPS that duplicate the first set of layer identifiers for a second operation point. The techniques of this disclosure have disallowed duplicate sets of layer identifiers for operation points in the same VPS within a conforming bitstream. The first set of layer identifiers must be unique to the first operation point in the VPS or the bitstream will be non-conforming. Video decoder 30 only decodes syntax elements in the VPS of the conforming bitstream that do not include duplicate sets of layer identifiers for the first operation point and the second operation point. In a case where video decoder 30 receives a non-conforming bitstream, video decoder 30 may enter a fault condition and discard the entire bitstream.

In another example, HRD parameters may be present for a first operation point. In this case, after coding syntax elements in a VPS within a bitstream indicating HRD parameter information having a first set of HRD parameters for the first operation point, video decoder 30 will only continue decoding if the bitstream is a conforming bitstream that does not include syntax elements in the VPS that duplicate the first set of HRD parameters for a second operation point. The techniques of this disclosure have disallowed duplicate sets of HRD parameters for operation points in the same VPS within a conforming bitstream. The first set of HRD parameters must be unique to the first operation point in the VPS or the bitstream will be non-conforming. Video decoder 30 only decodes syntax elements in the VPS of the conforming bitstream that do not include duplicate sets of HRD parameters for the first operation point and the second operation point. In a case where video decoder 30 receives a non-conforming bitstream, video decoder 30 may enter a fault condition and discard the entire bitstream.

As another example, video decoder 30 may receive an indication whether a simple operation point mode is used for each of a plurality of operation points of a bitstream. When the simple operation point mode is used for a particular one of the operation points, video decoder 30 may decode only one target layer identifier for the particular operation point. As another example, video decoder 30 may decode profile space, tier, compatible profiles, and/or profile-related constraints for a bitstream, but not decode separate profile space, tier, compatible profiles, or profile-related constraints for temporal sub-layers of the bitstream. As described above, video decoder 30 may decode HRD parameters for the bitstream wherein each copy of a HRD parameter syntax structure includes different content.

Figure 4:
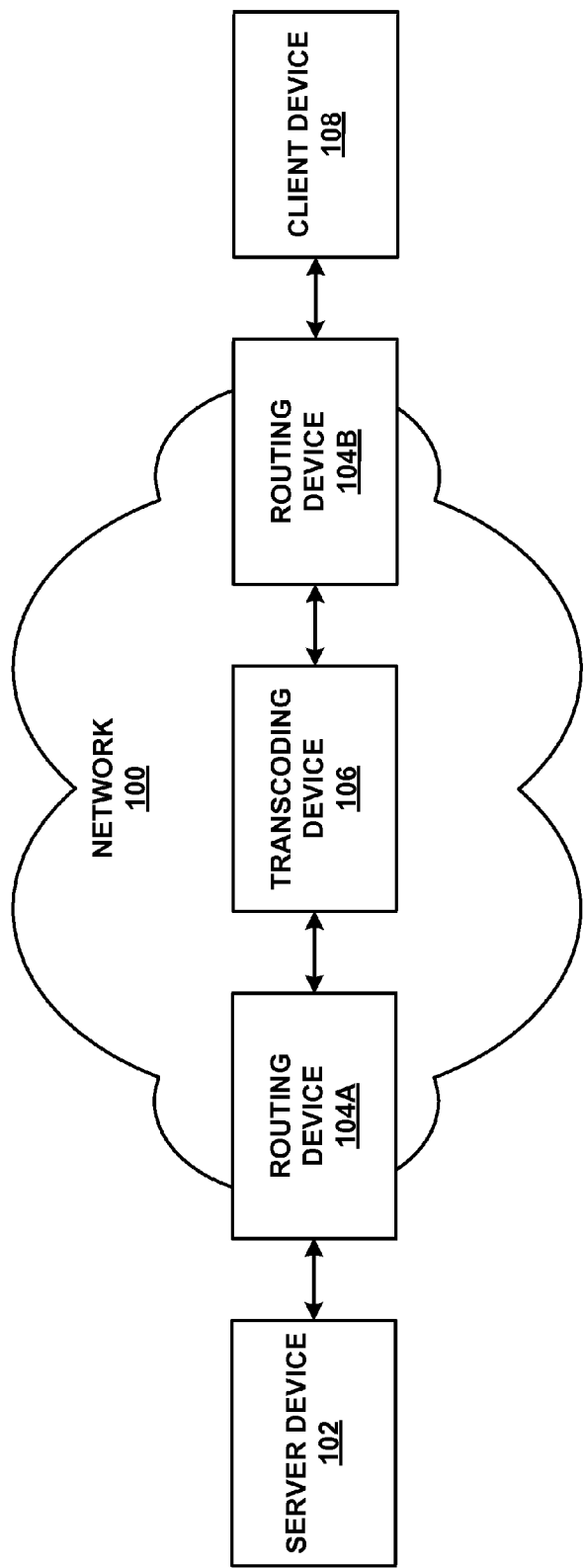
FIG. 4 is a block diagram illustrating an example set of devices that form part of a network.

FIG. 4 is a block diagram illustrating an example set of devices that form part of network 100. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such as routing devices 104 and transcoding device 106, but also may be implemented by client device 108. In this manner, routing devices 104, transcoding device 106, and client device 108 represent examples of devices configured to perform the techniques of this disclosure, including techniques recited in the CLAIMS portion of this disclosure. Moreover, the devices of FIG. 1, and the encoder shown in FIG. 2 and the decoder shown in FIG. 3 are also exemplary devices that can be configured to perform the techniques of this disclosure, including techniques recited in the CLAIMS portion of this disclosure.

As described in this disclosure, a "video coder" may be used to generally refer to both a video encoding device and a video decoding device. In addition, "video coding" may refer to video encoding or video decoding.

Figure 5:
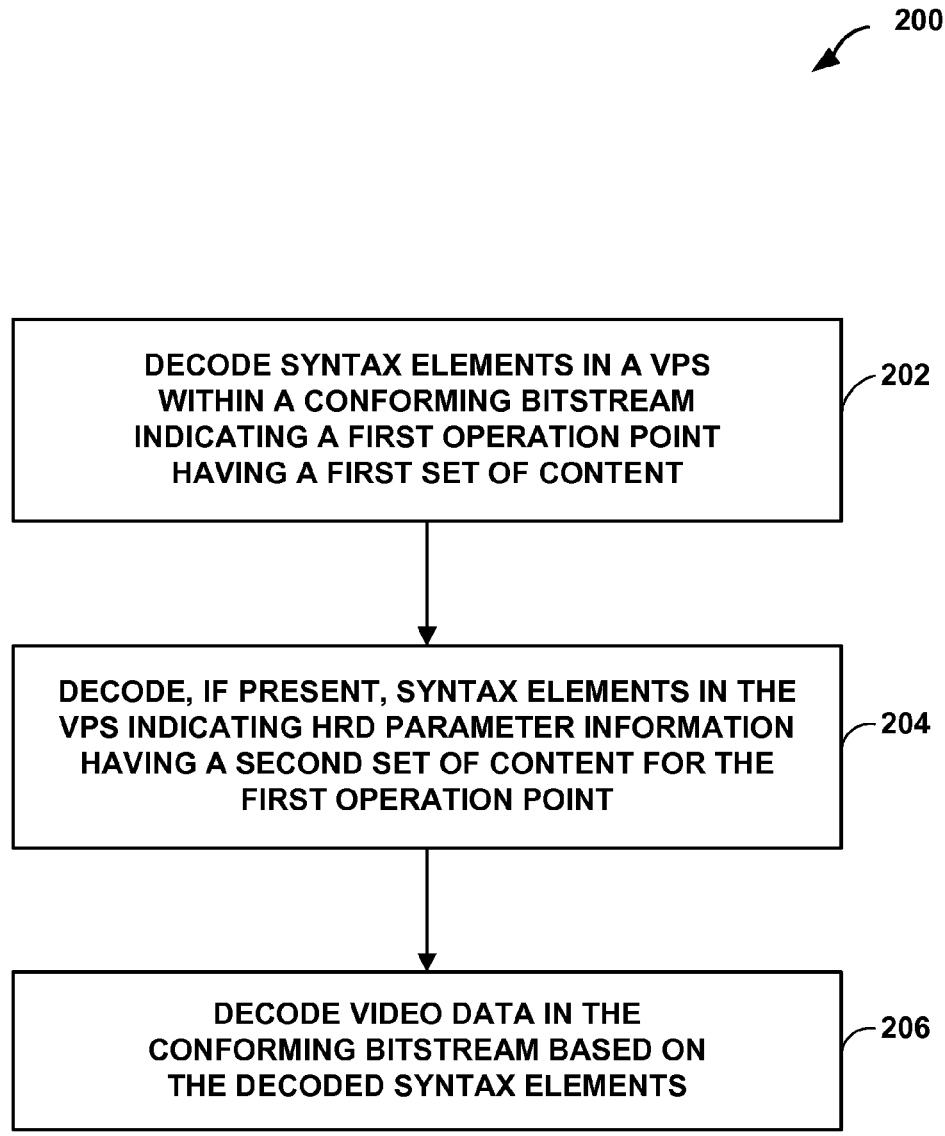
FIG. 5 is a flowchart illustrating an example method for decoding operation points used in video data, according to techniques described in this disclosure.

FIG. 5 is a flowchart illustrating an example method 200 of decoding video data, according to techniques described in this disclosure. Method 200 may be performed by any device, system, or apparatus configured to process video data, such as video decoder 30 of FIG. 1 or 3, for example.

Method 200 includes decoding syntax elements in a video parameter set (VPS) within a conforming bitstream indicating a first operation point having a first set of content (202). For example, video decoder 30 may decode syntax elements in a VPS within a conforming bitstream indicating a first operation point having a first set of content. In some examples, the syntax elements indicating the first operation point have an operation_point( ) syntax structure in the VPS within the conforming bitstream.

Method 200 further includes decoding syntax elements in the VPS within the conforming bitstream indicating hypothetical reference decoder (HRD) parameter information having a second set of content for the first operation point (204). According to techniques of this disclosure, the conforming bitstream does not include syntax elements in the VPS that duplicate at least one of the first or second set of content for a second operation point. For example, video decoder 30 decodes, if present, syntax elements in the VPS within the conforming bitstream indicating HRD parameter information having a second set of content for the first operation point. Video decoder 30 is configured to only decode conforming bitstreams, and conforming bitstreams do not include syntax elements in the VPS that duplicate at least one of the first or second set of content for a second operation point. In some examples, the syntax elements indicating the HRD parameter information have a hrd_parameters( ) syntax structure in the VPS within the conforming bitstream. In some examples, decoding syntax elements includes decoding the syntax elements indicating the first operation point and the HRD parameter information only within conforming bitstreams.

Method 200 further includes decoding video data in the conforming bitstream based on the decoded syntax elements (206). For example, video decoder 30 decodes video data in the conforming bitstream based at least partially on the syntax elements indicating a first operation point having a first set of content. Video decoder 30 further decodes video data in the conforming bitstream based at least partially on the syntax elements, if present, indicating HDR parameter information having a second set of content for the first operation point.

In some examples, the first set of content comprises a set of layer identifiers for the first operation point that identifies one or more network abstraction layer (NAL) units of the conforming bitstream that belong to a sub-bitstream of the first operation point. In some examples, the second set of content comprises a set of HRD parameters for the first operation point that defines a HRD used to check conformance of a sub-bitstream of the first operation point. In other examples, the conforming bitstream does not include syntax elements in the VPS that duplicate the first set of content for the second operation point, the first set of content being unique to the first operation point in the VPS. In further examples, the conforming bitstream does not include syntax elements in the VPS that duplicate the HRD parameter information having the second set of content for the second operation point, the second set of content being unique to the first operation point in the VPS.

In some examples, when the set of layer identifiers for the first operation point includes two or more layer identifiers, method 200 further comprises differentially decoding the two or more layer identifiers. That is, video decoder 30 differentially decodes the two or more layer identifiers when the set of layer identifiers for the first operation point includes two or more layer identifiers.

In another example, method 200 may include decoding one or more syntax elements within the conforming bitstream that indicate whether a simple operation point mode is in use for the first and second operation points. When the simple operation point mode is used for a particular one of the first and second operation points, method 200 may include decoding only a target layer identifier for the particular operation point. In one example, video decoder 30 decodes one or more syntax elements within the conforming bitstream that indicate whether a simple operation point mode is in use for the first and second operation points. When the simple operation point mode is used for a particular one of the first and second operation points, video decoder 30 decodes only a target layer identifier for the particular operation point. In some examples, the particular operation point is identified by the target layer identifier and a temporal identifier that indicates a temporal sub-layer of the conforming bitstream.

Method 200 may further include, based on the indication that the simple operation point mode is not used for the first operation point, explicitly decoding each layer identifier of the set of layer identifiers for the first operation point. For example, video decoder 30 decodes layer identifier of the set of layer identifiers for the first operation point based on the indication that the simple operation point mode is not used for the first operation point. Method 200 may further include, when the simple operation point mode is not used for a particular one of the operation points, differentially decoding a plurality of target layer identifiers for the particular operation point. For example, video decoder 30 differentially decodes a plurality of target layer identifiers for the particular operation point when the simple operation point mode is not used for a particular one of the operation points (e.g., when vsp_simple_op_mode_flag[i] is not present in the VPS or is equal to zero.

In some examples, method 200 further includes decoding syntax elements indicating one or more of profile space, tier, compatible profiles, and profile-related constraints for an entire decoded video sequence of the conforming bitstream, wherein the conforming bitstream does not include syntax elements indicating one or more of profile space, tier, compatible profiles, and profile-related constraints for one or more temporal sub-layers of the decoded video sequence. For example, video decoder 30 decodes syntax elements indicating one or more of profile space, tier, compatible profiles, and profile-related constraints for an entire decoded video sequence of the conforming bitstream. The conforming bitstream does not include syntax elements indicating one or more of profile space, tier, compatible profiles, and profile-related constraints for one or more temporal sub-layers of the decoded video sequence.

The syntax elements may indicate that one or more of profile space, tier, compatible profiles, and profile-related constraints for the temporal sub-layers are removed from a profile_tier_level( ) syntax structure in a VPS within the conforming bitstream. In some examples, method 200 further includes decoding one or more syntax elements indicating whether profile information is present for each of the temporal sub-layers of the conforming bitstream. When the profile information is present for a particular one of the temporal sub-layers, method 200 may further include decoding the profile information for the particular temporal sub-layer. For example, video decoder 30 decodes one or more syntax elements indicating whether profile information is present for each of the temporal sub-layers of the conforming bitstream, and when the profile information is present for a particular one of the temporal sub-layers, video decoder 30 decodes the profile information for the particular temporal sub-layer.

Similarly, method 200 further includes decoding one or more syntax elements indicating whether level information is present for each of the temporal sub-layers of the bitstream. When the level information is present for a particular one of the temporal sub-layers, method 200 further includes decoding the level information for the particular temporal sub-layer. For example, video decoder 30 decodes one or more syntax elements indicating whether level information is present for each of the temporal sub-layers of the bitstream and when the level information is present for a particular one of the temporal sub-layers, video decoder 30 decodes the level information for the particular temporal sub-layer. In some examples, the temporal sub-layers of the conforming bitstream are identified by temporal identifiers.

Figure 6:
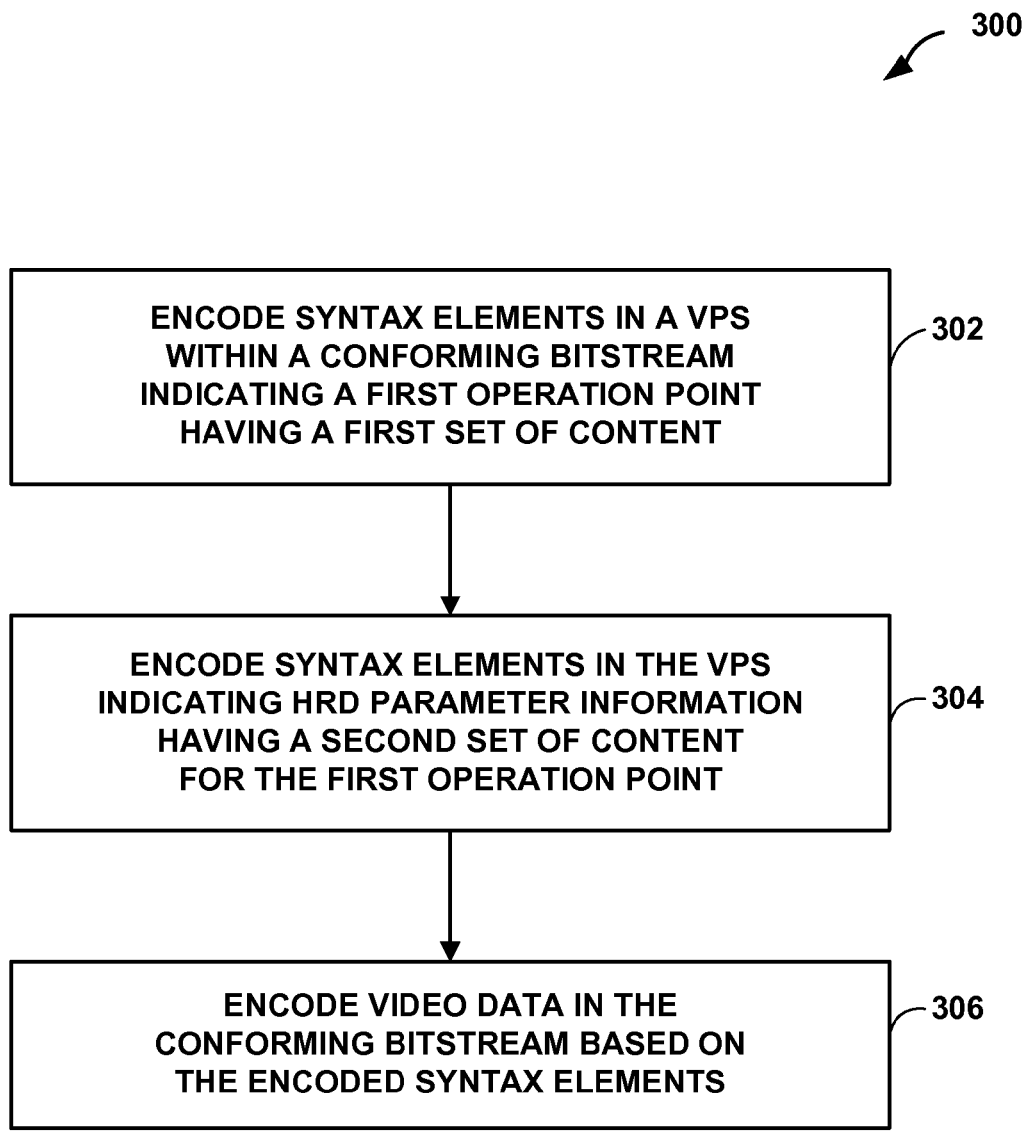
FIG. 6 is a flowchart illustrating an example method for encoding operation points used in video data, according to techniques described in this disclosure.

FIG. 6 is a flowchart illustrating an example method 300 of encoding video data, according to techniques described in this disclosure. Method 300 may be performed by any device, system, or apparatus configured to process video data, such as video encoder 20 of FIGS. 1 and 2, for example.

Method 300 includes encoding syntax elements in a video parameter set (VPS) within a conforming bitstream indicating a first operation point having a first set of content (302). For example, video encoder 20 may encode syntax elements in a VPS within a conforming bitstream indicating a first operation point having a first set of content. In some examples, the syntax elements indicating the first operation point have an operation_point( ) syntax structure in the VPS within the conforming bitstream.

Method 300 further includes encoding syntax elements in the VPS within the conforming bitstream indicating hypothetical reference decoder (HRD) parameter information having a second set of content for the first operation point (204). According to techniques of this disclosure, the conforming bitstream does not include syntax elements in the VPS that duplicate at least one of the first or second set of content for a second operation point. For example, video encoder 20 encodes, if present, syntax elements in the VPS within the conforming bitstream indicating HRD parameter information having a second set of content for the first operation point. Video encoder 20 is configured to only encode conforming bitstreams, and conforming bitstreams do not include syntax elements in the VPS that duplicate at least one of the first or second set of content for a second operation point. In some examples, the syntax elements indicating the HRD parameter information have a hrd_parameters( ) syntax structure in the VPS within the conforming bitstream.

Method 300 further includes encoding video data in the conforming bitstream based on the encoded syntax elements (306). For example, video encoder 20 encodes video data in the conforming bitstream based at least partially on the syntax elements indicating a first operation point having a first set of content. Video encoder 20 further encodes video data in the conforming bitstream based at least partially on the syntax elements indicating HDR parameter information having a second set of content for the first operation point.

In some examples, the first set of content comprises a set of layer identifiers for the first operation point that identifies one or more network abstraction layer (NAL) units of the conforming bitstream that belong to a sub-bitstream of the first operation point. In some examples, the second set of content comprises a set of HRD parameters for the first operation point that defines a HRD used to check conformance of a sub-bitstream of the first operation point. In other examples, the conforming bitstream does not include syntax elements in the VPS that duplicate the first set of content for the second operation point, the first set of content being unique to the first operation point in the VPS. In further examples, the conforming bitstream does not include syntax elements in the VPS that duplicate the HRD parameter information having the second set of content for the second operation point, the second set of content being unique to the first operation point in the VPS.

In some examples, when the set of layer identifiers for the first operation point includes two or more layer identifiers, method 300 further comprises differentially encoding the two or more layer identifiers. That is, video encoder 20 differentially encodes the two or more layer identifiers when the set of layer identifiers for the first operation point includes two or more layer identifiers.

In another example, method 300 may include encoding one or more syntax elements within the conforming bitstream that indicate whether a simple operation point mode is in use for the first and second operation points. When the simple operation point mode is used for a particular one of the first and second operation points, method 300 may include encoding only a target layer identifier for the particular operation point. In one example, video encoder 20 encodes one or more syntax elements within the conforming bitstream that indicate whether a simple operation point mode is in use for the first and second operation points. When the simple operation point mode is used for a particular one of the first and second operation points, video encoder 20 encodes only a target layer identifier for the particular operation point. In some examples, the particular operation point is identified by the target layer identifier and a temporal identifier that indicates a temporal sub-layer of the conforming bitstream.

Method 300 may further include, based on the indication that the simple operation point mode is not used for the first operation point, explicitly encoding each layer identifier of the set of layer identifiers for the first operation point. For example, video encoder 20 encodes layer identifier of the set of layer identifiers for the first operation point based on the indication that the simple operation point mode is not used for the first operation point. Method 300 may further include, when the simple operation point mode is not used for a particular one of the operation points, differentially encoding a plurality of target layer identifiers for the particular operation point. For example, video encoder 20 differentially encodes a plurality of target layer identifiers for the particular operation point when the simple operation point mode is not used for a particular one of the operation points (e.g., when vsp_simple_op_mode_flag[i] is not present in the VPS or is equal to zero.

In some examples, method 300 further includes encoding syntax elements indicating one or more of profile space, tier, compatible profiles, and profile-related constraints for an entire encoded video sequence of the conforming bitstream, wherein the conforming bitstream does not include syntax elements indicating one or more of profile space, tier, compatible profiles, and profile-related constraints for one or more temporal sub-layers of the encoded video sequence. For example, video encoder 20 encodes syntax elements indicating one or more of profile space, tier, compatible profiles, and profile-related constraints for an entire encoded video sequence of the conforming bitstream. The conforming bitstream does not include syntax elements indicating one or more of profile space, tier, compatible profiles, and profile-related constraints for one or more temporal sub-layers of the decoded video sequence.

The syntax elements may indicate that one or more of profile space, tier, compatible profiles, and profile-related constraints for the temporal sub-layers are removed from a profile_tier_level( ) syntax structure in a VPS within the conforming bitstream. In some examples, method 300 further includes encoding one or more syntax elements indicating whether profile information is present for each of the temporal sub-layers of the conforming bitstream. When the profile information is present for a particular one of the temporal sub-layers, method 300 may further include encoding the profile information for the particular temporal sub-layer. For example, video encoder 20 encodes one or more syntax elements indicating whether profile information is present for each of the temporal sub-layers of the conforming bitstream, and when the profile information is present for a particular one of the temporal sub-layers, video encoder 20 encodes the profile information for the particular temporal sub-layer.

Similarly, method 300 further includes encoding one or more syntax elements indicating whether level information is present for each of the temporal sub-layers of the bitstream. When the level information is present for a particular one of the temporal sub-layers, method 300 further includes encoding the level information for the particular temporal sub-layer. For example, video encoder 20 encodes one or more syntax elements indicating whether level information is present for each of the temporal sub-layers of the bitstream and when the level information is present for a particular one of the temporal sub-layers, video encoder 20 encodes the level information for the particular temporal sub-layer. In some examples, the temporal sub-layers of the conforming bitstream are identified by temporal identifiers.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining, for each received bitstream of a plurality of received bitstreams of video data, that the received bitstream is a non-conforming bitstream if the received bitstream includes syntax elements in a video parameter set (VPS) that duplicate content for hypothetical reference decoder (HRD) parameter information for different operation points signaled in the VPS;
    determining, for each received bitstream of the plurality of received bitstreams of video data, that the received bitstream is a conforming bitstream if the received bitstream does not include any syntax elements in the VPS that duplicate the content for the HRD parameter information for different operation points signaled in the VPS;
    for at least one bitstream of the plurality of received bitstreams determined to be conforming:
        decoding first syntax elements in the VPS within the bitstream indicating first HRD parameter information; and
        decoding, if present, second syntax elements in the VPS within the bitstream indicating second HRD parameter information that is different from the first HRD parameter information.

2. The method of claim 1, wherein the bitstream determined to be conforming does not include syntax elements in the VPS that duplicate the second HRD parameter information.

3. The method of claim 1, further comprising decoding one or more syntax elements within the bitstream determined to be conforming, the one or more decoded syntax elements indicating whether a simple operation point mode is in use for one or more of the different operation points.

4. The method of claim 3, further comprising decoding, based on an indication that the simple operation point mode is used for a first operation point of the different operation points, only a target layer identifier of a set of layer identifiers for the first operation point of the different operation points, wherein the first operation point is identified by the target layer identifier and a temporal identifier that indicates a temporal sub-layer of the bitstream determined to be conforming.

5. The method of claim 3, further comprising explicitly decoding, based on an indication that the simple operation point mode is not used for a first operation point of the different operation points, each layer identifier of a set of layer identifiers for the first operation point of the different operation points.

6. The method of claim 1, wherein the first HRD parameter information defines HRD parameter information used to check conformance of a sub-bitstream of a first operation point of the different operation points.

7. The method of claim 1, wherein the syntax elements indicating the first HRD parameter information comprise a hrd_parameters( ) syntax structure in the VPS within the bitstream determined to be conforming.

8. The method of claim 1, further comprising decoding syntax elements indicating one or more of profile space, tier, compatible profiles, and profile-related constraints for an entire coded video sequence of the bitstream determined to be conforming, wherein the bitstream determined to be conforming does not include syntax elements indicating one or more of profile space, tier, compatible profiles, and profile-related constraints for one or more temporal sub-layers of the coded video sequence.

9. The method of claim 8, wherein the syntax elements indicating one or more of profile space, tier, compatible profiles, and profile-related constraints for the temporal sub-layers are not included in a profile_tier_level( ) syntax structure in the VPS within the bitstream determined to be conforming.

10. A method of encoding video data, the method comprising:
    encoding a bitstream of video data such that the bitstream is a conforming bitstream,
        wherein non-conforming bitstreams include syntax elements in a video parameter set (VPS) that duplicate content for hypothetical reference decoder (HRD) parameter information for different operation points,
        wherein the conforming bitstream does not include any syntax elements in the VPS that duplicate the content for the HRD parameter information for the different operation points, and
        wherein encoding the bitstream comprises:
            encoding first syntax elements within the conforming bitstream, the first syntax elements indicating first HRD parameter information; and
            encoding second syntax elements in the VPS within the conforming bitstream, the second syntax elements indicating second HRD parameter information that is different from the first HRD parameter information.

11. The method of claim 10, wherein the conforming bitstream does not include syntax elements in the VPS that duplicate the second HRD parameter information.

12. The method of claim 10, further comprising:
    encoding, within the conforming bitstream, one or more syntax elements that indicate whether a simple operation point mode is in use for one or more of the different operation points.

13. The method of claim 12, further comprising, based on an indication that the simple operation point mode is used for a first operation point of the different operation points, encoding only a target layer identifier of a set of layer identifiers for the first operation point, wherein the first operation point is identified by the target layer identifier and a temporal identifier that indicates a temporal sub-layer of the conforming bitstream.

14. The method of claim 13, further comprising, based on an indication that the simple operation point mode is not used for a first operation point of the different operation points, explicitly encoding each layer identifier of a set of layer identifiers for the first operation point.

15. The method of claim 10, wherein the first HRD parameter information defines HRD parameter information used to check conformance of a sub-bitstream of a first operation point of the different operation points.

16. The method of claim 10, wherein the second syntax elements indicating the first HRD parameter information comprise a hrd_parameters( ) syntax structure in the VPS within the conforming bitstream.

17. The method of claim 10, further comprising encoding third syntax elements indicating one or more of profile space, tier, compatible profiles, and profile-related constraints for an entire coded video sequence of the conforming bitstream, wherein the conforming bitstream does not include syntax elements indicating one or more of profile space, tier, compatible profiles, and profile-related constraints for one or more temporal sub-layers of the coded video sequence.

18. The method of claim 17, wherein the third syntax elements indicating one or more of profile space, tier, compatible profiles, and profile-related constraints for the temporal sub-layers are not included in a profile_tier_level( ) syntax structure in the VPS within the conforming bitstream.

19. A video coding device comprising:
a memory configured to store video data of one or more bitstreams; and
a video coder configured to:
code a conforming bitstream, wherein a determination of whether the bitstream is conforming is defined such that:
bitstreams that include syntax elements in a video parameter set (VPS) that duplicate hypothetical reference decoder (HRD) parameter information for different operation points are determined to be non-conforming bitstreams, and
bitstreams that do not include any syntax elements in the VPS that duplicate the HRD parameter information for the different operation points are determined to be conforming bitstreams, and
wherein to code the conforming bitstream, the video coder is configured to:
code first syntax elements in the VPS within a conforming bitstream, the first syntax elements indicating first HRD parameter information; and
code, if present, second syntax elements in the VPS within the conforming bitstream, the second syntax elements indicating second HRD parameter information that is different from the first HRD parameter information.

20. The video coding device of claim 19, wherein the conforming bitstream does not include syntax elements in the VPS that duplicate the second HRD parameter information.

21. The video coding device of claim 19, wherein the video coder is further configured to code one or more syntax elements within the conforming bitstream, the one or more coded syntax elements indicating whether a simple operation point mode is in use for one or more of the different operation points.

22. The video coding device of claim 21, wherein the video coder is further configured to code, based on an indication that the simple operation point mode is used for a first operation point of the different operation points, only a target layer identifier of a set of layer identifiers for the first operation point of the different operation points, wherein the first operation point is identified by the target layer identifier and a temporal identifier that indicates a temporal sub-layer of the conforming bitstream.

23. The video coding device of claim 21, the video coder further configured to explicitly code, based on an indication that the simple operation point mode is not used for a first operation point of the different operation points, each layer identifier of a set of layer identifiers for the first operation point of the different operation points.

24. The video coding device of claim 19, wherein the first HRD parameter information defines HRD parameter information used to check conformance of a sub-bitstream of a first operation point of the different operation points.

25. The video coding device of claim 19, wherein the second syntax elements indicating the first HRD parameter information comprise a hrd_parameters( ) syntax structure in the VPS within the conforming bitstream.

26. The video coding device of claim 19, the video coder further configured to code syntax elements indicating one or more of profile space, tier, compatible profiles, and profile-related constraints for an entire coded video sequence of the conforming bitstream, wherein the conforming bitstream does not include syntax elements indicating one or more of profile space, tier, compatible profiles, and profile-related constraints for one or more temporal sub-layers of the coded video sequence.

27. The video coding device of claim 26, wherein the third syntax elements indicating one or more of profile space, tier, compatible profiles, and profile-related constraints for the temporal sub-layers are not included in a profile_tier_level( ) syntax structure in the VPS within the conforming bitstream.

28. The video coding device of claim 19, wherein the video coder comprises a video decoder configured to:
decode the first syntax elements in the VPS indicating the first HRD parameter information, and
decode, if present, the second syntax elements in the VPS indicating the second HRD parameter information that is different from the first HRD parameter information.

29. The video coding device of claim 19, wherein the video coder comprises a video encoder configured to:
encode the first syntax elements in the VPS indicating the first HRD parameter information, and
encode, if present, the second syntax elements in the VPS indicating the second HRD parameter information that is different from the first HRD parameter information.

30. A non-transitory computer-readable storage medium having stored thereon instructions that, when executed, cause a processor of a device for coding video data to:
code a conforming bitstream, wherein a determination of whether the bitstream is conforming is defined such that:
bitstreams that include syntax elements in a video parameter set (VPS) that duplicate hypothetical reference decoder (HRD) parameter information for different operation points are determined to be non-conforming bitstreams, and bitstreams that do not include any syntax elements in the VPS that duplicate the HRD parameter information for the different operation points are determined to be conforming bitstreams, and wherein the instructions that cause the processor to code the conforming bitstream include instructions that, when executed, cause the processor to:

code first syntax elements in the VPS within a conforming bitstream, the first syntax elements indicating first HRD parameter information; and code, if present, second syntax elements in the VPS within the conforming bitstream, the second syntax elements indicating second HRD parameter information that is different from the first HRD parameter information.

31. The non-transitory computer-readable storage medium of claim 30, wherein the conforming bitstream does not include syntax elements in the VPS that duplicate the second HRD parameter information.

32. A video coding device comprising:

means for coding a conforming bitstream, wherein a determination of whether the bitstream is conforming is defined such that:

bitstreams that include syntax elements in a video parameter set (VPS) that duplicate hypothetical reference decoder (HRD) parameter information for different operation points are determined to be non-conforming bitstreams, and bitstreams that do not include any syntax elements in the VPS that duplicate the HRD parameter information for the different operation points are determined to be conforming bitstreams, and wherein the means for coding the conforming bitstream includes:

means for coding first syntax elements in the VPS within a conforming bitstream, the first syntax elements indicating first HRD parameter information; and means for coding, if present, second syntax elements in the VPS within the conforming bitstream, the second syntax elements indicating second HRD parameter information that is different from the first HRD parameter information.

33. The video coding device of claim 32, wherein the conforming bitstream does not include syntax elements in the VPS that duplicate the second HRD parameter information.

34. The video coding device of claim 32, wherein the first HRD parameter information defines HRD used to check conformance of a sub-bitstream of a first operation point of the different operation points.

* * * * *